(12) United States Patent
Molaie Shargh et al.

(10) Patent No.: US 12,337,747 B2
(45) Date of Patent: Jun. 24, 2025

(54) RATCHET HANDLE WITH ROTATABLE GRIP

(71) Applicant: Hampton Products International Corporation, Foothill Ranch, CA (US)

(72) Inventors: Hossein Molaie Shargh, Rancho Santa Margarita, CA (US); Jacob Dykstra, Lake Forest, CA (US); Chasen Beck, Garden Grove, CA (US); Kevin Wilson, Rancho Santa Margarita, CA (US)

(73) Assignee: Hampton Products International Corporation, Foothill Ranch, CA (US)

( * ) Notice: Subject to any disclaimer, the term of this patent is extended or adjusted under 35 U.S.C. 154(b) by 331 days.

(21) Appl. No.: 18/097,689

(22) Filed: Jan. 17, 2023

(65) Prior Publication Data
US 2024/0239625 A1    Jul. 18, 2024

(51) Int. Cl.
*B60P 7/08* (2006.01)
*B65H 75/44* (2006.01)

(52) U.S. Cl.
CPC ............. *B60P 7/083* (2013.01); *B60P 7/0823* (2013.01); *B65H 75/4494* (2013.01)

(58) Field of Classification Search
CPC ..... B60P 7/0823–0869; B65H 75/4494; Y10T 24/21; Y10T 24/2113; Y10T 24/2117; Y10T 24/2121; Y10T 24/2175
See application file for complete search history.

(56) References Cited

U.S. PATENT DOCUMENTS

| | | | | |
|---|---|---|---|---|
| 3,354,919 A | * | 11/1967 | Sugaya ................. | B25B 23/108 81/448 |
| 4,154,427 A | * | 5/1979 | Hofmann ............... | B60P 7/083 254/223 |
| 4,227,286 A | * | 10/1980 | Holmberg ............. | B60P 7/083 254/218 |
| 4,390,141 A | * | 6/1983 | Webster ................ | B60P 7/083 242/395 |
| 5,791,844 A | * | 8/1998 | Anderson .............. | B60P 7/083 410/101 |
| 8,209,821 B1 | * | 7/2012 | Chen ..................... | B60P 7/083 24/69 ST |
| 2004/0042197 A1 | * | 3/2004 | Wu ........................ | B60P 7/083 362/84 |
| 2004/0083575 A1 | * | 5/2004 | Chou .................... | B60P 7/083 16/110.1 |
| 2011/0167599 A1 | * | 7/2011 | Wright .................. | A44B 11/125 24/68 CD |
| 2014/0020218 A1 | * | 1/2014 | Lu ......................... | B60P 7/083 24/68 CD |

* cited by examiner

*Primary Examiner* — Anna M Momper
*Assistant Examiner* — Nathaniel L Adams

(57) ABSTRACT

A ratcheting mechanism assembly includes a ratcheting mechanism and a rotatable grip rotatably coupled to the ratcheting mechanism. The ratcheting mechanism includes a base, a reel with ratchet gears at opposite sides of the reel and rotatably coupled to the base about a reel axis, and a ratchet handle rotatable relative to the base about the reel axis. The rotatable grip rotates about a fixed grip of the ratchet handle during a ratcheting process.

7 Claims, 3 Drawing Sheets

RATCHET HANDLE WITH ROTATABLE GRIP

FIELD

The subject matter herein generally relates to a tie-down, and specifically to a ratchet handle of the ratchet tie-down.

BACKGROUND

The ratchet tie-down assembly is a useful device for strapping down heavier cargo, typically on a truck bed. The ratchet tie-down assembly often includes a ratcheting mechanism, a first webbing with a first hook permanently affixed to the ratcheting mechanism, and a second longer webbing with a second hook attached to a distal end and a free proximal end feedable into the ratcheting mechanism. The hooks are generally hooked onto anchor points and the free end of the second webbing is placed over the cargo and pulled through the ratcheting mechanism. The ratchet handle is then operated in an upward and downward movement about an axis of the ratcheting mechanism to further tighten the webbing and better secure the cargo against the truck bed.

BRIEF DESCRIPTION OF THE DRAWINGS

Implementations of the present technology will now be described, by way of example only, with reference to the attached figures, wherein.

DETAILED DESCRIPTION

Figure 1:
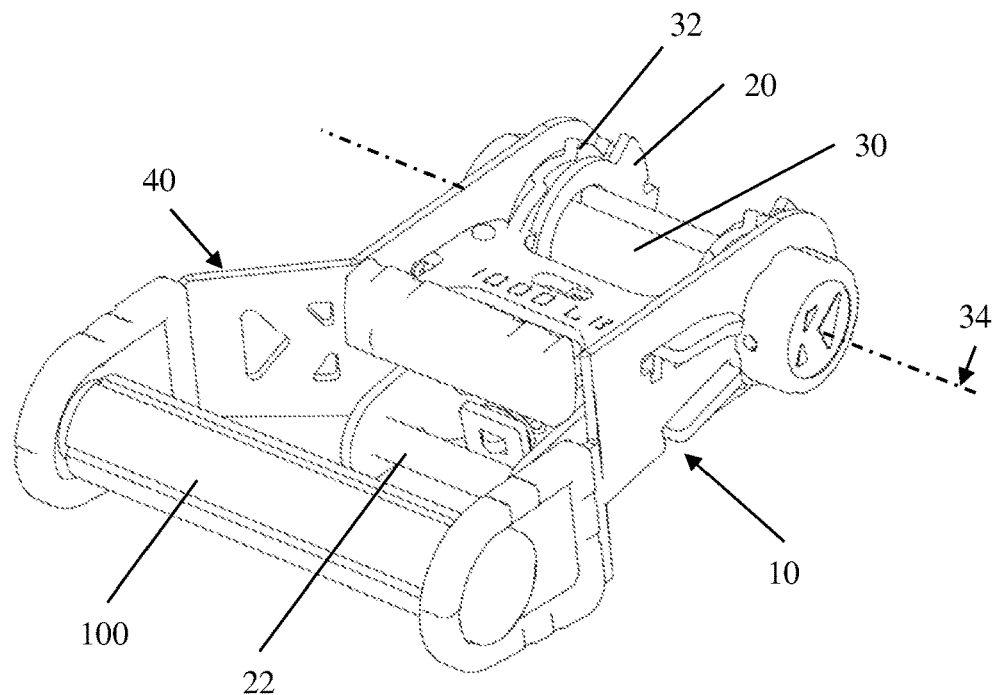
FIG. 1 is an embodiment of a ratcheting mechanism for a ratchet tie-down assembly with a rotatable grip.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of a ratcheting mechanism 10 for a ratchet tie-down assembly (not shown) and a rotatable grip 100 coupled to a ratchet handle 40 of the ratcheting mechanism 10. The ratcheting mechanism 10 includes a base 20 with a rod 22 coupled to the base 20, a reel 30 rotatably coupled to the base 20 about a reel axis 34, ratchet gears 32 at opposite sides of the reel 30, and the ratchet handle 40, which is rotatable relative to the base 20 about the reel axis 34. A webbing (not shown) with a hook at one end can be fixed to the ratcheting mechanism 10 by forming a loop sewn closed around the rod 22.

Figure 2:
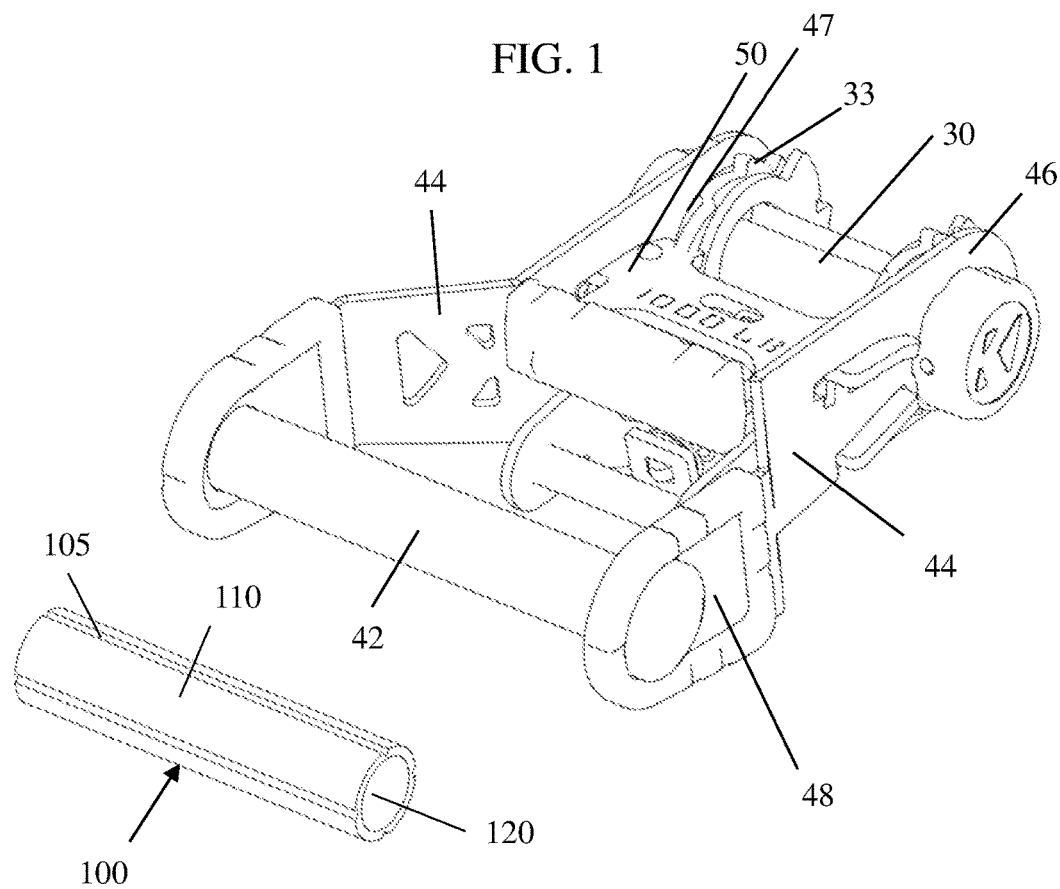
FIG. 2 is an exploded view of the ratcheting mechanism.

Referring also to FIG. 2, the ratchet handle 40 includes two handle sides 44, a fixed grip 42 having opposite ends fixed to distal ends 48 of the handle sides 44, and a ratchet pawl 50 slidably coupled to the handle sides 44 between the distal ends 48 and proximal ends 46 of the handle sides 44. Each proximal end 46 of the handle sides 44 has a circular opening 47 for receiving ends of the reel 30. Each handle side 44 can flare outward beginning at a certain distance along the handle side 44 from the ratchet pawl 50 to the fixed grip 42.

The fixed grip 42 can be substantially cylindrical and fixed to the handle sides 44 to form a rigid ratchet handle 40. In another embodiment in which only one handle side extends up to the fixed grip 42, the fixed grip 42 is coupled to only one handle side 44 for allowing users with larger hands to operate the ratchet handle 40. In this embodiment, the ratchet handle 40 may only have one handle side 42 extending to the fixed grip 42, in which case the fixed grip 42 can be cantilevered off the handle side 44 at least during operation of the ratchet handle 40.

Before operation of the ratcheting mechanism 10 begins, the free end of another webbing anchored to an anchor point is pulled through a slot 36 in the reel 30 until most of the slack on the webbings is removed. The webbing can be further pulled to a desired tension, by rotating the ratchet handle 40 about the base 20, otherwise known as ratcheting. The ratchet handle 40 provides a mechanical advantage to increase the tension of the webbings.

Ratcheting starts with a user gripping the fixed grip 42 and pulling on the ratchet handle 40, thereby rotating the ratchet handle 40 in a direction away from the base 20. The release pawl 50 on the ratchet handle 40 engages and presses against a flat portion of teeth 33 of the ratchet gears 32. This engagement causes the reel 30 to rotate and wrap the webbing around the reel 30 as the reel 30 is rotated. The user can then push on the ratchet handle 40 in an opposite direction, in which case the release pawl 50 to disengage and pass over the teeth 33, in which case the reel 30 does not rotate with the ratchet handle 40. This pulling and pushing process is repeated until a desired tension is met. Typically, the webbing is wrapped around the reel 30 about two to four times at the desired tension.

The rotatable grip 100 can be a hollow structure with an outer surface 110 and an inner surface 120 and can have an inner diameter substantially as large or larger than a diameter of the fixed grip 42. The rotatable grip 100 is rotatably coupled to the fixed grip 42 of the ratchet handle 42. This allows the rotatable grip 100 to rotate as the user is gripping the rotatable grip 100 and moving the ratchet handle 40 in an up and down movement during the ratcheting process. The outer surface 110 can be formed to have a pattern to improve a user's grip on the rotatable grip 100. The rotational resistance (i.e., friction) between the rotatable grip 100 and the fixed grip 42 can depend on the size of the inner diameter of the rotatable grip 100 relative to the outer diameter of the fixed grip 42, material of the rotational grip 100, and other factors affecting the coefficient of friction. Taking one factor as an example, for simplicity, if the inner diameter of the rotatable grip 100 is slightly smaller than or equal to the outer diameter of the fixed grip 42, there may be some resistance to the amount of rotation, and if the inner diameter of the rotatable grip 100 is slightly smaller than the outer diameter of the fixed grip 42, there will be no rotational resistance. In this embodiment, the rotatable grip 100 can be permanently coupled to the fixed grip during assembly of the ratchet tie-down or can be coupled after assembly if the fixed grip 42 can be partially or entirely detached from one or more handle sides 40.

The rotatable grip 100 can have a raised pattern 105 to aid the user by providing a stronger grip.

Figure 3:
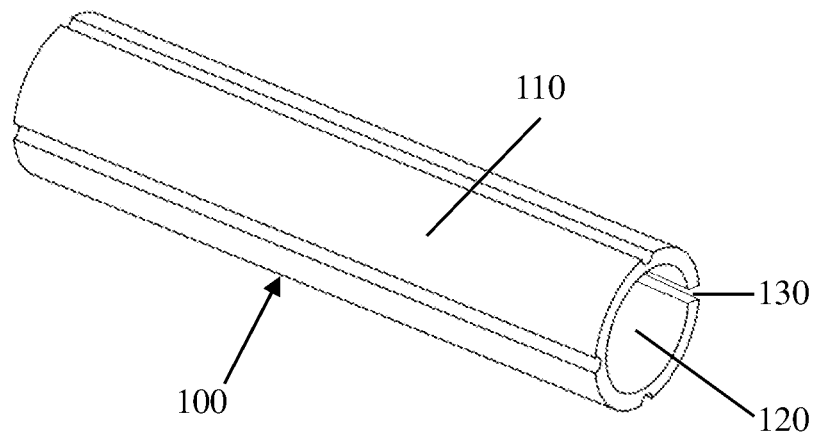
FIG. 3 is another embodiment of a rotatable grip.

FIG. 3 illustrates another embodiment of the rotatable grip 100 with a slot 130 to allow the rotatable grip to open up and fitted over a fixed grip 42 of any ratchet tic-down. In this embodiment, the rotatable grip 100 is elastic so that after the rotatable grip 100 is opened up to fit over an existing fixed grip 42, the rotatable grip 100 grip can return back to its original shape. A material of the rotatable grip 100 can comprise of a polymer and a material of the fixed grip can be made of a metal. After the rotatable grip 100 is fitted over the fixed grip 42, the rotatable grip should be able to rotate smoothly over the outer surface of the fixed grip 42. A strap can be tightened around the rotatable grip to increase the rotational resistance between the rotatable grip 100 and the fixed grip 42 and prevent removal or slippage of the rotatable grip 100 off the fixed grip 42. The strap, for example, can have hooks on one side and loops on the other side (e.g., hook and loop fastener) mated together to hold the strap tightened around the rotatable grip 100.

Figure 4:
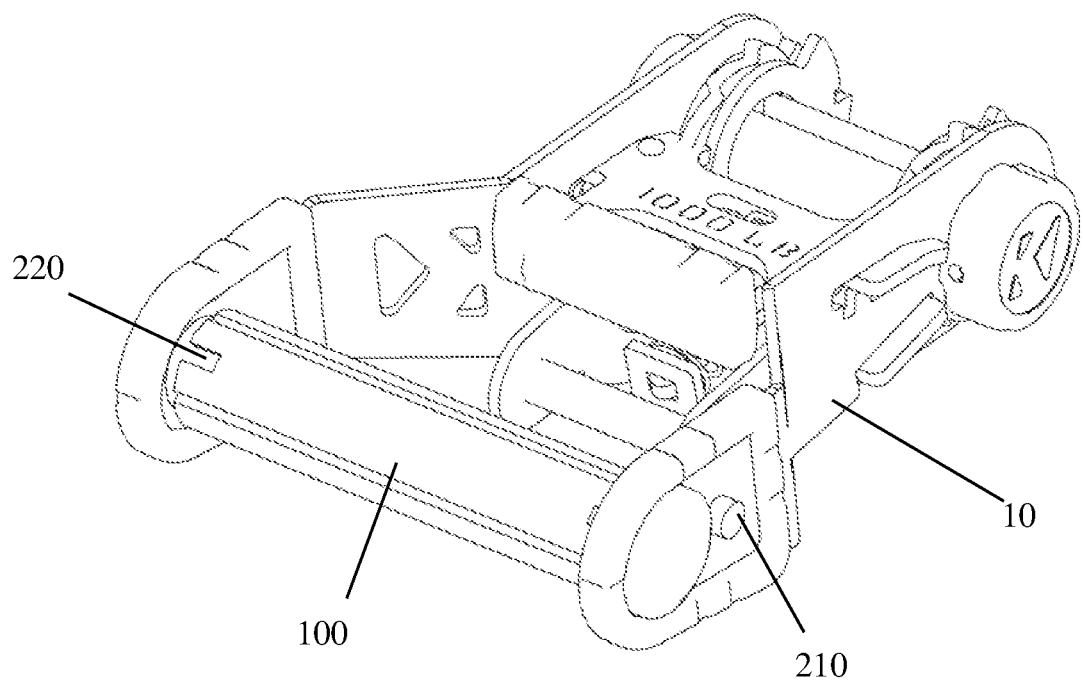
FIG. 4 is an embodiment of a ratcheting mechanism with a lockable rotatable grip.

FIG. 4 illustrates a locking feature of a ratcheting mechanism 10 to prevent the rotatable grip 100 from rotating for moments when grip rotation is not desired. In one embodiment, the locking feature includes one or more tabs 210 that can extend into a slot 220 of the rotatable grip 100 to prevent rotation.

Figure 5:
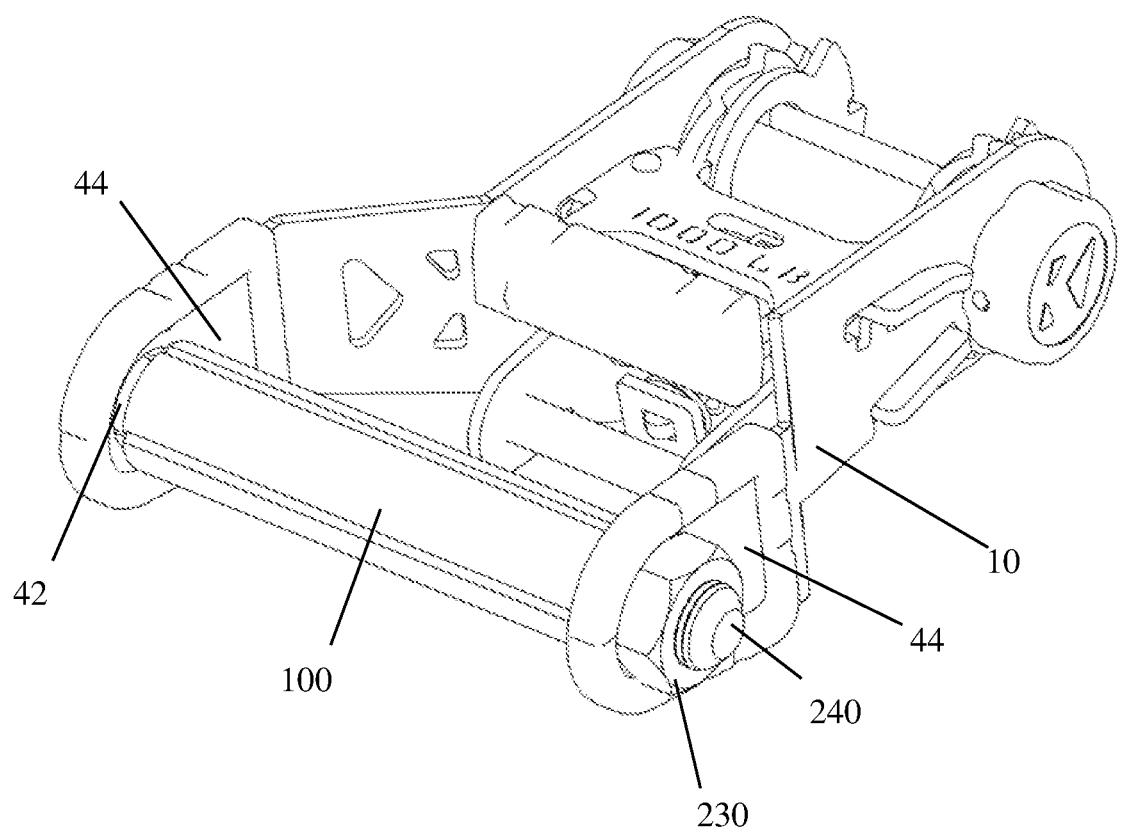
FIG. 5 is another embodiment of a ratcheting mechanism with a lockable rotatable grip.

FIG. 5 illustrates another embodiment in which a locking feature of a ratcheting mechanism 10 includes a threaded nut 230 coupled to a threaded extension 240 at or near one side or opposite sides of the fixed grip 42 outside of one or both handle sides 44. The threaded nut 230 can be rotated to move the handle sides 44 closer together thereby applying a compression load against the rotatable grip 100 to limit rotation of the rotatable grip 100. If rotation of the rotatable grip 100 is later desired, the threaded nut 230 can be backed off by rotation of the threaded nut 230 in the opposite direction.

In yet another embodiment, the rotatable grip 100 can be fixed when moved towards a handle side 44. This can be accomplished by an interference fit between the fixed grip 42 and rotatable grip 100, created by having a larger diameter on the fixed grip 42 or handle side 44.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A ratchet tie-down mechanism, comprising
   a base;
   a reel rotatably coupled to the base and having a reel axis;
   a ratchet handle rotatably coupled to the base about the reel axis, the ratchet handle comprising a fixed grip fixed to at least one handle side;
   a rotatable grip rotatably coupled to the fixed grip, the rotatable grip having an inner diameter and an outer surface; and
   a locking feature comprising a tab extendable into an opening to prevent the rotatable grip from rotating about the fixed grip.

2. The ratchet tie-down mechanism of claim 1, wherein the rotatable grip is elastic and has a slot extending from opposite ends.

3. The ratchet tie-down mechanism of claim 2, wherein the inner diameter of the rotatable grip in a relaxed state prior to installation to the fixed grip is equal to or smaller than a diameter of the fixed grip.

4. The ratchet tie-down mechanism of claim 3, wherein the slot of the rotatable grip is capable of opening up to a width equal to or larger than a diameter of the fixed grip.

5. The ratchet tie-down mechanism of claim 1, further comprising a webbing coupled to the base, wherein the inner diameter of the rotatable grip is equal to or larger than a diameter of the fixed grip.

6. A ratchet tie-down mechanism, comprising
   a ratchet handle rotatably coupled to a base and a reel, the ratchet handle comprising two handle sides and a fixed grip having opposite ends fixed to the handle sides;
   a rotatable grip surrounding the fixed grip, the rotatable grip being rotatable around the fixed grip and having an opening; and
   a webbing coupled to an end of the base, wherein the ratchet handle further comprises a tab extendable from at least one handle side into the opening of the rotatable grip to limit rotation of the rotatable grip.

7. The ratchet tie-down mechanism of claim 6, wherein the inner diameter of the rotatable grip is equal to or larger than a diameter of the fixed grip.

* * * * *